Sept. 9, 1969  O. C. BLOMGREN  3,465,683
ROTARY FLUID DISPLACEMENT DEVICE
Filed March 24, 1967  3 Sheets-Sheet 1
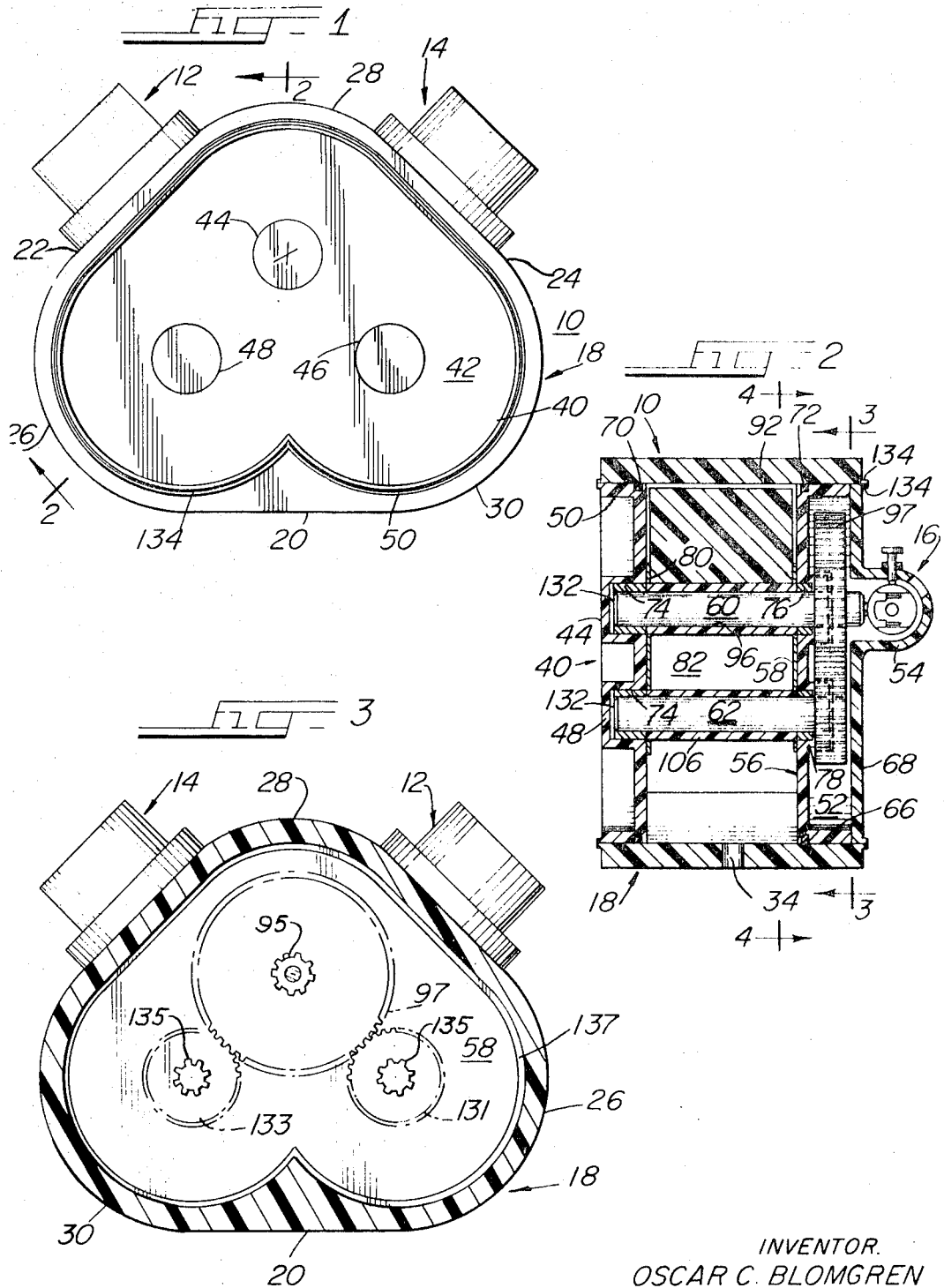
INVENTOR.
OSCAR C. BLOMGREN
BY Fidler, Bradley & Patnaude
Attys.

Sept. 9, 1969  O. C. BLOMGREN  3,465,683
ROTARY FLUID DISPLACEMENT DEVICE
Filed March 24, 1967  3 Sheets-Sheet 2
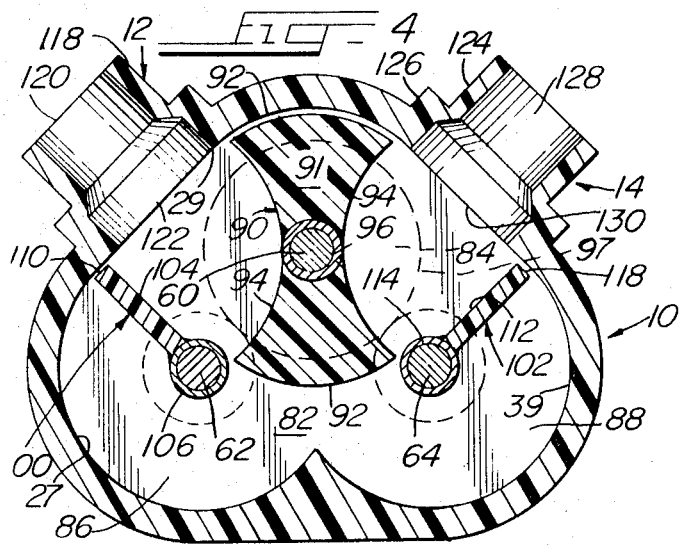
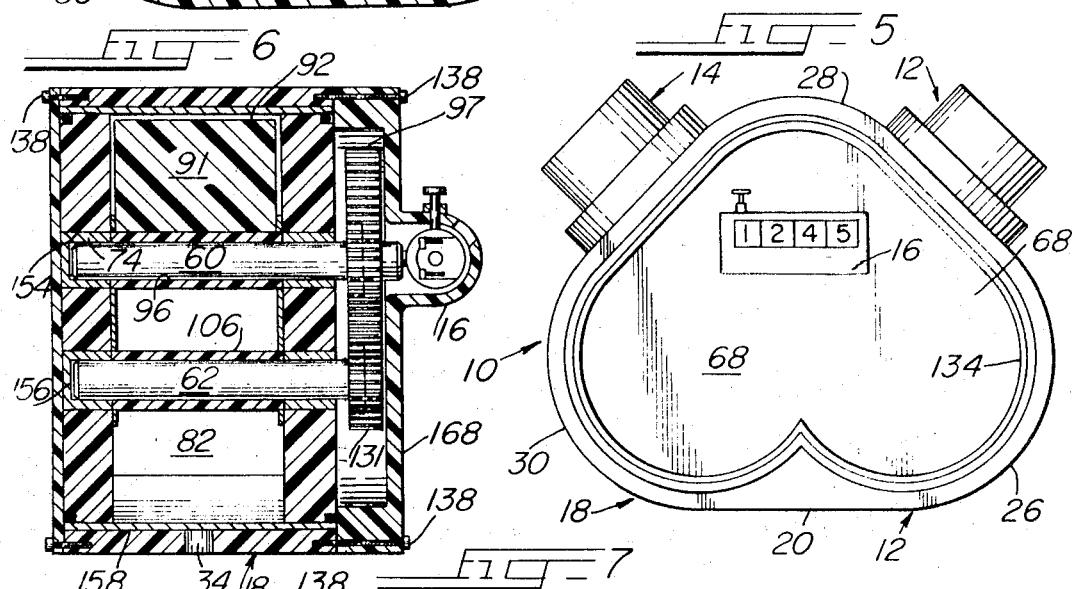
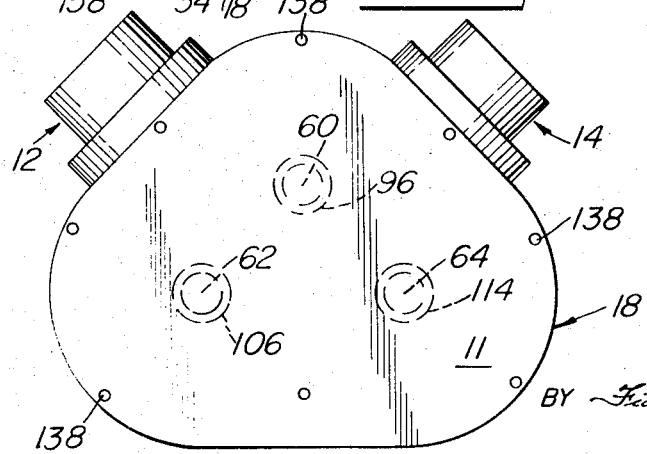
INVENTOR
OSCAR C. BLOMGREN

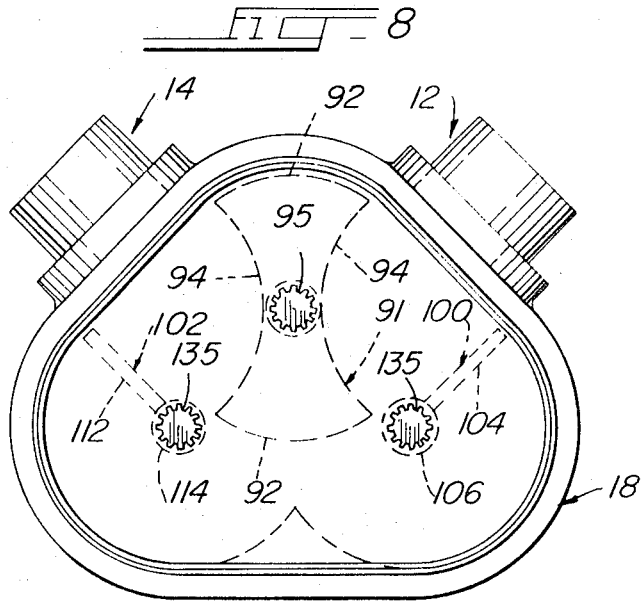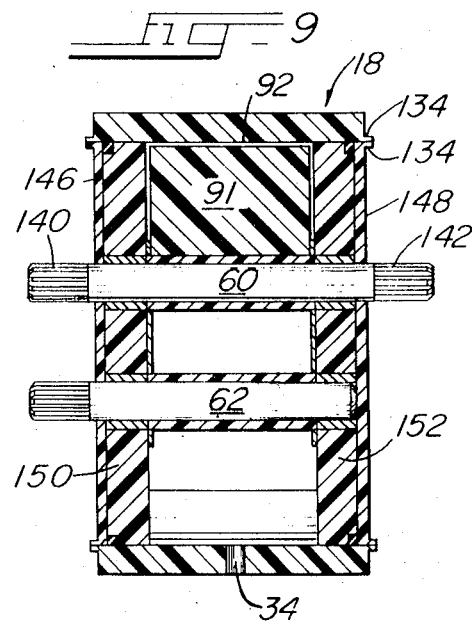

United States Patent Office 3,465,683
Patented Sept. 9, 1969

3,465,683
ROTARY FLUID DISPLACEMENT DEVICE
Oscar C. Blomgren, Lake Bluff, Ill., assignor to Liquid Controls Corporation, Chicago, Ill., a corporation of Illinois
Filed Mar. 24, 1967, Ser. No. 625,777
Int. Cl. F04c 1/00, 3/00; F04b 21/08
U.S. Cl. 103—125                                                     5 Claims

ABSTRACT OF THE DISCLOSURE

A plastic meter or pump having parts that are standardized and easily formed and assembled. The housing is tubular with integrally formed inlet and outlet ports and is closed by end plates with integrally formed bearing bosses for supporting the bearings and shafts of the rotors. The parts may be easily assembled one into the other with inserts to accommodate for different clearances between parts so as to permit standardized parts in meters or pumps requiring different clearances.

---

This invention relates to fluid displacement devices such as fluid meters, hydraulic motors, pumps, compressors or blowers, and more particularly, relates to rotary fluid displacement devices.

Rotary fluid displacement devices include one or more rotors adapted to turn within a housing through which the fluid flows. In a fluid meter for example, the fluid flowing through the meter exerts pressure against the rotor blades causing the rotor to turn. The motion of the rotor is measured to indicate the amount of fluid flowing through the meter. In fluid pumps, the rotors are turned by an external driving means. As the rotors turn, the rotor blades force the fluid through the pump.

To fabricate fluid displacement devices economically the fluid displacement devices should be easily adaptable for use in a number of applications. With this type of standardization, many economies are achieved because of the production of the units in quantities. However, some prior art fluid displacement devices of the rotary type do not permit ready adjustment of the end clearance of the internal moving parts to enable the same devices to be used with fluids of differing viscosities. This limits their adaptability greatly, particularly in the case of fluid meters for measuring liquid products that are handled in bulk form since there is a wide variety of such liquids having differing viscosities.

Another disadvantage of some prior art fluid displacement devices is that they include a large number of parts. The fabrication and assembly of these parts increases the cost of such devices greatly. Moreover, many of these rotary displacement devices require many costly metal machining operations in their fabrication. In some fluid displacement devices additional expense is entailed in providing proper rotary and axial thrust absorbing bearings and bearing plates for the rotors. One reason for this high cost is related to the requirement that these bearings and bearing plates be able to handle the heat generated by the rotation of the rotor.

Accordingly, it is an object of this invention to provide an improved rotary fluid displacement device which can be fabricated economically.

It is a further object of this invention to provide a fluid displacement device which includes a minimum of working parts, each of which may be economically fabricated.

It is a still further object of this invention to provide a fluid displacement device in which the individual parts are formed to be easily and economically assembled together.

It is a still further object of this invention to provide a rotary fluid displacement device having improved rotary and axial thrust absorbing bearings and bearing plates.

It is a still further object of this invention to provide a rotary fluid displacement device having an improved arrangement for cooling the bearings of the rotors.

It is a still further object of this invention to provide a rotary fluid displacement device in which the clearance for moving parts may be simply adjusted to accommodate fluids of differing viscosities.

In accordance with the above and further objects, a rotary fluid displacement device is provided which is at least partially fabricated from plastic. The plastic parts are molded, and then finished by a broaching operation. Some of the parts of the rotary displacement device are formed to fit one inside of the other in the manner of cartridges. This construction simplifies the assembly of the parts into the completed rotary displacement device. The machining operations which must be performed are done easily on the plastic material. Because they are plastic, sections of the casing of the rotary displacement device are easily welded together.

Bearing bosses to accommodate the bearing plates and shafts of the rotors are molded into the plastic housing of the rotary displacement device. These bearing bosses have cylindrical internal apertures which accommodate metal bearings. A housing can be adapted to utilize shafts of differing sizes by inserting bearings with wall thickness to compensate for the various size shafts. The bearing plates may also be of differing thicknesses to conveniently adjust for axial clearances of the shafts.

In accordance with another feature of the invention the journals, bearings and bearing bosses fit one into the other. The bearings may be of the cup type to increase the ease of assembly. These cartridge-like structures are easily assembled in the initial fabrication, and are just as easily disassembled for repair or cleaning. The bearing bosses dissipate heat from their outer cylindrical surfaces directly to the air in a manner superior to mountings which are flush with the external surface of the rotary displacement device casings. They provide a large bearing surface in their internal apertures and, at the same time, provide a large external surface for the dissipation of heat generated within the bearing.

Shoes may be inserted into the internal chamber of the rotary displacement device to accommodate for different clearances between the blades of the rotors and the walls of the housing. The housing and the rotors have thin walls with rounded surfaces to be especially adapted for molding from plastic. The thin walls alleviate difficulties from the shrinking of the material in the mold, and the smaller sections of the housing permit a relatively short draw in the molding process.

The invention and the above noted and other features thereof will be more readily understood from the following detailed description when considered with reference to the accompanying drawings in which:

FIG. 1 is a rear elevational view of a fluid displacement device embodying the invention;

FIG. 2 is a transverse cross-sectional view taken along lines 2—2 of FIG. 1;

FIG. 3 is a front cross-sectional view taken along lines 3—3 of FIG. 2;

FIG. 4 is a front cross-sectional view taken along lines 4—4 of FIG. 2;

FIG. 5 is a front elevational view of a meter embodying the invention;

FIG. 6 is a transverse cross-sectional view of another embodiment of the invention;

FIG. 7 is a rear elevational view of the embodiment of the invention shown in FIG. 6;

FIG. 8 is a front elevational view of an embodiment of the invention showing the interior of the gear compartment of the fluid displacement device; and FIG. 9 is a cross-sectional view of another embodiment of the invention.

In FIGS. 1–5 an embodiment of the invention is shown as it is used in a fluid meter which includes a housing 10 having an inlet spool 12 including an inlet port, an outlet spool 14 including an outlet port, and a counter 16 (FIGS. 2, 5 and 6). The housing 10 comprises a tubular casing 18 having lateral flat portions 20, 22 and 24 interconnected by arcuate portions 26, 28 and 30. The tubular casing 18 is closed at one end by the back end plate 40 which has a generally flat portion 42 with the three raised cylindrical bosses 44, 46 and 48. The end plate 40 has a peripheral flange 50 orthogonal to the flat portion 42 and sealingly engaging the inner surface of the casing 18.

The front end of the tubular casing 18 is closed by a tubular gear compartment 52 which is formed integrally with the casing 54 of the counter 16. The tubular gear compartment 52 includes a cup-like end plate 56 having a flat portion 58 with three cylindrical journals accommodating the shafts 60, 62 and 64. It also has a peripheral flange 66 which sealingly engages the inner surface of the casing 18. A gear compartment cover 68, which is integral with the counter-compartment 54, closes the tubular gear compartment 52.

The end plate 40 is sealed to the tubular casing 18 by means of a square O-ring 70; the end plate 56 is sealed against the tubular casing 18 by a square O-ring 72. Each of the shafts 60, 62 and 64 is supported within a different one of the cylindrical bosses 44, 46 and 48 respectively by means of different ones of the three bearings 74. Each of the shafts is supported on its other end by a different one of the bearings 76, which bearings are each supported by a different one of the three flanges 78 formed integrally with the end plate 56 around the shaft-receiving apertures. The shafts are each sealed on both ends by the shaft seals 80.

The tubular casing 18, the back end plate 40, and the gear compartment 52 enclose a hollow space 82 of generally trefoil cross-sectional form containing the shafts 60, 62 and 64 which extend longitudinally between the back end plate 40 and the gear compartment 52. The shafts 60, 62 and 64 are positioned parallel to each other and equidistant from each other, each having its central axis at the center of curvature of a different one of the three arcuate wall portions 28, 26 and 30 respectively.

The shaft 60 is within a portion of the space 82 that is partially defined by the arcuate wall portion 28 and serves as a blocking rotor chamber 84; the shaft 62 is within a portion of the enclosed space 82 partially defined by the curved wall portion 26 which serves as an inlet chamber 86; and the shaft 64 is within a portion of the space 82 defined partially by the arcuate wall portion 38 which serves as an outlet chamber 88.

The shaft 60 passes through a cylindrical bore 96 in the hub of a blocking rotor 90, and having an interference fit therewith, causes the blocking rotor 90 to rotate with the shaft 60. The periphery of the blocking rotor 90 is formed with two diametrically-opposing covex, cylindrically-arcuate sealing portions 92 concentric with the center of the shaft 60 and two diametrically-opposed concave cylindrical-arcuate portions 94. The blade 91 of the blocking rotor 90 is of such a size that its convex peripheral portions 92 sweep in close proximity to the arcuate wall portions 29 of the blocking chamber 84 to form a liquid seal therewith.

The shaft 60 is journaled at one end to the bearing 74 which is seated in the bearing boss 44. The other end of the shaft 60 is journaled in the bearing 76 and extends into the gear compartment 52. This end has a plurality of square spline keys 95 adapted to engage complementary keyways in the gear 97 (FIGS. 2 and 3). The shaft extends beyond the gear 97 into the counter compartment 54 (FIG. 2), and is necked down into a narrower shaft also having keys around its outer periphery. These final keys engage the mechanism of the counter 16 turning therewith to indicate the number of revolutions of the blocking rotor 90.

The shafts 62 and 64 are each part of different displacement rotors 100 and 102 respectively. The displacement rotor 100 includes a planar blade 104 welded to the periphery of a cylindrical hub 106, which is formed with a tight interference fit around the shaft 62 to turn therewith. The planar blade 104 extends from the cylindrical hub 106 to the arcuate portion 27 of the inlet chamber 86 between the end plate 40 and the gear chamber 56. The planar rotor blade 104 and hub 106 are such sizes that the end portion 110 of the blade 104 sweeps in close proximity to the wall 27 as the displacement rotor turns and the cylindrical hub 106 passes close to the periphery 92 of the blocking rotor 90 as the blocking rotor turns.

Similarly the second displacement rotor includes a planar rotor blade 112 welded to the periphery of a cylindrical hub 14 which circumscribes the shaft 64 with an interference fit to turn therewith. The planar blade 112 extends between the cylindrical hub 114 and the arcuate surface 39 of the outlet chamber 88. The blade 112 and the hub 114 are of such sizes that the end 118 of the blade 112 sweeps close to the arcuate surface 39 and the peripheral portions 92 of the blocking rotor 90 sweep near the hub 114 as the blocking rotor turns. The end surfaces of each of the rotors include a plurality of serrations which cause turbulence as they pass by adjacent surfaces forming a liquid seal.

The inlet spool 12 includes a first tubular cylinder 118 having a cylindrical bore 120 adapted to receive a fluid to be measured. A counterbore 122 communicates with the cylindrical bore 120 and the interior of the meter 82 at a location between the blocking chamber 84 and the inlet chamber 86. The outlet 14 includes the cylinder 124 having the enlarged shoulder 126 adjacent to the flat portion 24 of the casing 18. The cylindrical bore 128 is adapted to pass the metered liquid. A counter bore 128 is connects the interior of the pump 82 to the cylindrical bore 128 at a location between the blocking chamber 82 and the outlet chamber 88.

The blocking rotor and the displacement rotors are geared together in driving relationship so that they rotate simultaneously at a predetermined angular velocity. They are also maintained in a predetermined angular or phase relationship. To this end, the timing gear 97, which is mounted to the shaft 60, engages with the timing gears 131 and 133 mounted on the shafts 62 and 64 respectively, by means of the keys 135 (FIG. 3) and keyways. These timing gears have the proper diameter and number of teeth to cause the blocking rotor 91 to make one revolution for every two revolutions of each of the two displacement rotors. The flow of the liquid through the inlet 12 causes the displacement rotors 104 and 112 to rotate, and since each is connected to the gear 97, the latter is rotated at one half the speed of the displacement rotors. This gearing maintains the proper speed and phase relationship between each of the rotors.

This phase relationship is best illustrated in FIGS. 4 and 8. As seen in FIG. 4, the blocking rotor rotates in a counterclockwise direction, while each of the displacement rotors rotate in a clockwise direction. The inlet and outlet of the rotary meter are always blocked by the combination of the blocking rotor 91 and one or both of the displacement rotors 104 and 112. The blades of the rotors that are blocking the inlet and the outlet both sweep toward the outlet while they form this blocking link. Whenever the blades of the displacement rotors are moving toward the inlet and away from the outlet, the rotor to which they are connected does not form a continuous link between the sides of the chamber 82 together with the blocking rotor 91. The operation of this meter is more fully explained in U.S. Patent No. 2,835,229 to G. B.

Richards, issued May 20, 1958, for Rotary Positive Displacement Device for Liquids.

The rotary displacement device of this invention utilizes a molded tubular casing 18, molded plastic end plates 40, 56 and 68, molded gears 97, 131 and 133, and rotors 91, 100 and 102. Any of these parts may be molded from a suitable plastic such as that sold commercially under the name "Delrin," and then broached to a suitable dimension and finish.

It will be noted that the parts are of basically simple construction, consisting of various cylindrical shapes. The walls are all thin and relatively short so as to be suitable for molding from plastic. The bearings 74 and 76 may be made of any suitable metal bearing material. The cylindrical bearing plates 132, which are positioned at the flat portion of each of the bearing bosses 44, 46 and 48, are also of any suitable bearing material. The bearings 74, 76, and the bearing plates 132 are of selected sizes to adjust for the size of the shaft 60 and the clearances between the ends of the shafts and the bottoms of the bosses 44, 46 and 48. The bearings are conveniently slipped into the bearing bosses 44, 46 and 48. The shafts may then be fitted to the end bearings and the rotors forced over the shafts. The end plates 56 are then positioned over the shafts and rotor. The timing gears are next positioned over the ends of the shafts, and the gear housing 52 closed with the plate 68. The seals 70, 72, 76 and 80 are positioned during this assembly operation. It can be seen that each part fits conveniently into another part so as to facilitate assembly.

The blades of the rotors are lubricated by fluid that continuously passes through slots in the blades and through the open ends of the blades. An aperture 34 is positioned at any suitable location in the outer casing 18 to permit draining of the fluid displacement device. This aperture is normally closed by a plastic plug which may be removed to drain the fluid displacement device.

Both the end plates and the casing include complementary lip portions 134 (FIG. 9). With these lip portions, the end plates may be sealed to the tubular housing by welding the lips 134 together. Of course, instead of welding the end plates to the casing 18, it is possible to drill holes into the plastic end plates and the casing and to fasten them together with a plurality of screws 138, as shown in FIGS. 6 and 7.

The shaft 60 may have keyways cut on both ends to engage keys in the timing gear 96 with the keyways 140 on one end, and to engage the mechanism for the counter 16 on the other end with the keyways 142. This is shown in the embodiment of FIGS. 8 and 9. This type of construction is flexible and permits the parts of the fluid displacement device to be adapted to many other uses. The keyways 142 may be connected, for example, to the output of a motor to operate the fluid displacement device as a pump or may be geared to a remote indicating device such as a synchro system. Suitable synchro systems are obtainable under the brand name "Selsyn."

In the embodiments of FIGS. 6 and 9, the bearing bosses 44, 46 and 48 are not used. The end plates 146 and 148 merely include apertures through which the shafts pass for connection to counters, timing gears, or, in the case of pumps or hydraulic motors, driving gears. Trefoil plates 150 and 152 are positioned with one of their two flat sides adjacent to the inner surfaces of the end plates 146 and 148 respectively. These plates conform to the inner surface of a casing 18, and include apertures through which the shafts 60, 62 and 64 pass. The support plates 150 and 152 provide a support for the bearings 74 and 78 to which the shafts 60, 62 and 64 are journaled. They also provide extra sealing surfaces for the fluid displacement device. The support plates 150 and 152 may also be composed of a suitable plastic material such as the aforementioned Delrin material.

In the embodiment of FIG. 6, cup-type bearings are used to support an end of the shafts 60, 62 and 64 as illustrated by the bearings 154 and 156. This embodiment also illustrates the use of trefoil shoes such as 158 which fit inside the chamber 82 in sealing engagement with the interior walls thereof. These shoes may be used with any embodiment. They compensate for clearances between the rotors and the chamber walls for different viscosity liquids.

Many of the parts of the fluid displacement devices described in the above embodiments are interchangeable with the corresponding parts of other embodiments. Also fluid displacement devices in accordance with this invention are suitable for use in handling fluids of a wide range of viscosities without requiring numerous different size parts for each different fluid. The tubular casing 18 and the end plates may be used for pumps or meters. The rotors, shafts, and gears are not only adaptable for use with pumps or meters, but may be used to handle fluids in either of these types of devices, which fluids have different properties and viscosities. To handle a fluid having a different viscosity, the end clearances of the parts of adjusted with insertable shoes. Different size shafts and bearings can be accommodated by the same size bearing support through the use of plastic inserts within the bearing supports. Many of the parts may be economically fabricated from plastic. Besides being economical, parts made of some plastics are chemically inert and therefore suitable for use with either acidic or corrosive fluids. These features enable the parts to be standardized resulting in further economies.

It can be seen that the rotary fluid displacement device of this invention includes a minimum number of parts, each of which may be easily fabricated and many of which can be easily assembled by fitting them one into the other. The bearings may be of reduced size and cost because of the simple supporting structure and the increased surface area that permits heat dissipation. At the same time the bearing load is conveniently distributed. Clearance between the shafts and the bearing plates is adjustable by means of calibrated bearing plates placed within the molded bearing bosses.

Of course many variations and modifications may be made in the embodiment above disclosed in the light of the above tetachings. However, it is to be understood that, within the scope of the appended claims, the invention may be practiced otherwise than as specifically described.

I claim:

1. A rotary fluid displacement device comprising:
   a housing having a fluid chamber and an inlet and an outlet therefor;
   a plurality of shafts mounted within said fluid chamber;
   a corresponding plurality of rotors each mounted to a different one of said plurality of shafts;
   said housing having a plurality of spaced apart bearing bosses projecting externally from said housing, each of said bearing bosses corresponding to one of said plurality of shafts and having an internal aperture adapted to support the corresponding shaft, whereby the heat generated as the shaft rotates in a predetermined relation with the passage of fluids through the fluid chamber from said inlet to said outlet is readily dissipated from the external surfaces of said spaced apart bearing bosses;
   said housing including a tubular casing to which said inlet and outlet are integrally molded and two end plates sealingly closing said tubular casing;
   said first end plate including said plurality of spaced apart bearing bosses integrally molded therein;
   said tubular casing, said first end plate, and second end plate, being comprised of plastic;
   said casing and at least one of said first and second end plates having complementary flanges welded together to form a seal circumscribing said one of said first and second end plates;
   said bosses having bearings and thrust plates mounted therein; and said thrust plates and bearings having a size dependent upon the selection of any of several different size shafts to be included in said fluid displacement device.

2. A rotary fluid displacement device comprising:

a housing having a fluid chamber and an inlet and an outlet therefor;

a plurality of shafts mounted within said fluid chamber;

a corresponding plurality of rotors each mounted to a different one of said plurality of shafts;

said housing having a plurality of spaced apart bearing bosses projecting externally from said housing, each of said bearing bosses corresponding to one of said plurality of shafts and having an internal aperture adapted to support the corresponding shaft, whereby the heat generated as the shaft rotates in a predetermined relation with the passage of fluids through the fluid chamber from said inlet to said outlet is readily dissipated from the external surfaces of said spaced apart bearing bosses;

said housing including a tubular casing into which said inlet and outlet are formed and further including first and second end plates each sealingly closing a different side of said tubular casing;

said first end plate including said bearing bosses and said second end plate including a corresponding plurality of flanged apertures adapted to support the other ends of said shafts;

said plurality of rotors and corresponding plurality of shafts being adapted to rotate in relation to the flow of a fluid from said inlet into said fluid chamber and out of said outlet, said fluid having a predetermined viscosity;

an insert shaped to conform to said housing and being positioned in said fluid chamber;

at least one of said rotors having a blade with a flanged edge that passes adjacent to the inner surface of said insert to create a fluid seal therewith due to the turbulence of the fluid; and the thickness of said insert being directly proportional to the viscosity of said fluid, whereby inserts of a selected thickness may be inserted into said housing to correspond with the viscosity of the predetermined fluid enabling the same housing to be efficiently used with fluids of different viscosities.

3. A rotary fluid displacement device comprising:

a housing having a tubular casing and first and second end plates;

said tubular casing including an inlet and an outlet;

said first and second end plates each sealingly closing a different side of said tubular casing to form a fluid chamber between said inlet and said outlet, whereby fluid of a predetermined viscosity flows through said inlet into said fluid chamber and out of said outlet;

at least one rotor adapted to turn within said fluid chamber in relation to the fluid flowing between said inlet and outlet and having a serrated edge passing adjacent to the interior wall of said housing;

an insert positioned in said fluid chamber and shaped to conform to said housing;

said insert having a thickness related to the viscosity of said fluid to form a fluid seal between the serrated edges of said rotor and said housing for said fluid, whereby the same rotary fluid displacement device may be used for fluid of different viscosity by utilizing an insert having a thickness suitable to the viscosity of the fluid being used.

4. A rotary fluid displacement device in accordance with claim 3 further including:

a shaft;

said first and second end plates having bearings and a thrust plate mounted therein to accommodate said shaft;

said bearings and thrust plate having a size dependent upon the selection of any of several different size shafts for use in said fluid displacement device;

said rotor being mounted to said shaft;

said tubular casing, first and second end plates, and said insert comprising plastic;

said inlet and outlet being formed integrally with said tubular casing;

at least one of said end plates being welded to said tubular casing.

5. A rotary fluid displacement device in accordance with claim 4 further including:

at least one other shaft and rotor and corresponding bearings in said first and second end plates, said shaft and rotors being adapted to rotate in relation to each other;

said first end plate including a plurality of spaced apart bearing bosses extending externally to said housing and having internal walls forming bearing surfaces for said shafts, whereby heat is dissipated from the external surfaces of the spaced apart bearing bosses.

References Cited

UNITED STATES PATENTS

| 2,835,229 | 5/1958 | Richards | 91—92 |
| 2,965,040 | 12/1960 | Eisenberg. | |
| 2,966,860 | 1/1961 | Maynard. | |
| 3,128,710 | 4/1964 | Blomgren et al. | |
| 804,657 | 11/1905 | Handoll. | |
| 3,146,717 | 9/1964 | Tyree. | |
| 3,162,140 | 12/1964 | Petit. | |

DONLEY J. STOCKING, Primary Examiner

W. J. GOODLIN, Assistant Examiner

U.S. Cl. X.R.

103—126, 216